UNITED STATES PATENT OFFICE.

HERMANN ENDEMANN, OF BROOKLYN, NEW YORK, ASSIGNOR TO WILLIAM ZAHN, OF NEWARK, NEW JERSEY.

PROCESS OF TAWING HIDES.

SPECIFICATION forming part of Letters Patent No. 472,701, dated April 12, 1892.

Application filed November 10, 1891. Serial No. 411,439. (Specimens.)

*To all whom it may concern:*

Be it known that I, HERMANN ENDEMANN, a citizen of the United States, and a resident of Brooklyn, in the county of Kings and State of New York, have invented certain new and useful Improvements in Processes of Tawing Hides, of which the following is a specification.

This invention relates to an improved process of tawing skins for the purpose of making kid-leather; and the invention consists in a process of tawing hides by subjecting the same to the action of a bath containing a chrome salt and next treating the same with a solution containing a cuprous salt.

In carrying out my invention one hundred pounds of well-prepared hide are first immersed in a solution composed of five pounds of bichromate of potash and two pounds of salt, which are dissolved in five gallons of water, to which two and a half pounds of hydrochloric acid are added. The hides remain in this solution until they are thoroughly soaked, which takes usually from three to five hours; but in the case of thin skins less than three hours are required. The excess of the liquor is then removed by spreading and pressing, after which the skins are next subjected to the action of a bath which contains for every two hundred pounds of hides to be treated five and one-half pounds of sulphate of copper, thirty pounds of salt, (common,) and six pounds of alum, dissolved in twenty-five gallons of water. This solution is run into a closed vat containing copper-cuttings, and is left to stand upon them until the solution has become almost colorless, which indicates that the cupric salt is reduced to cuprous salt, which is kept in solution by the presence of the common salt (sodium chloride.) This solution is now ready to act on the hides which are immersed into it. As soon as the hides are immersed into this solution their previous yellow color is rapidly changed into a greenish-blue color, as the hides contain chrome as well as copper, after which they are ready for further treatment.

In preparing the before-described copper solution cupric chloride may be used in place of cupric sulphate; also, in place of common salt any other neutral substance which is known to be a solvent of cuprous chloride may be used. The solution once used may be reinforced from time to time by the addition of such substances as have disappeared from it partly or wholly by being taken up by the skins. The solution may, after being treated with metally copper, be again used for another quantity of chrome-treated hides. The solution which cannot be used any more can be freed from copper by running it into tanks containing scrap-iron, on which the copper is precipitated.

In place of treating the skins first with a chrome solution the copper solution can be first applied to the skins prepared for tawing, after which they are treated with the acidified bichromate of potash solution before described.

Having thus described my invention, I claim as new and desire to secure by Letters Patent—

The process herein described of tawing hides, which consists in treating the same with a chrome solution and then subjecting them to the action of a solution of cuprous salt, substantially as set forth.

In testimony that I claim the foregoing as my invention I have signed my name in presence of two subscribing witnesses.

HERMANN ENDEMANN.

Witnesses:
PAUL GOEPEL,
CHARLES SCHROEDER.